Nov. 17, 1942.                C. A. BAKER                 2,302,169
                    APPARATUS FOR FREEZING BULK MATERIALS
                        Filed June 28, 1940           3 Sheets-Sheet 1
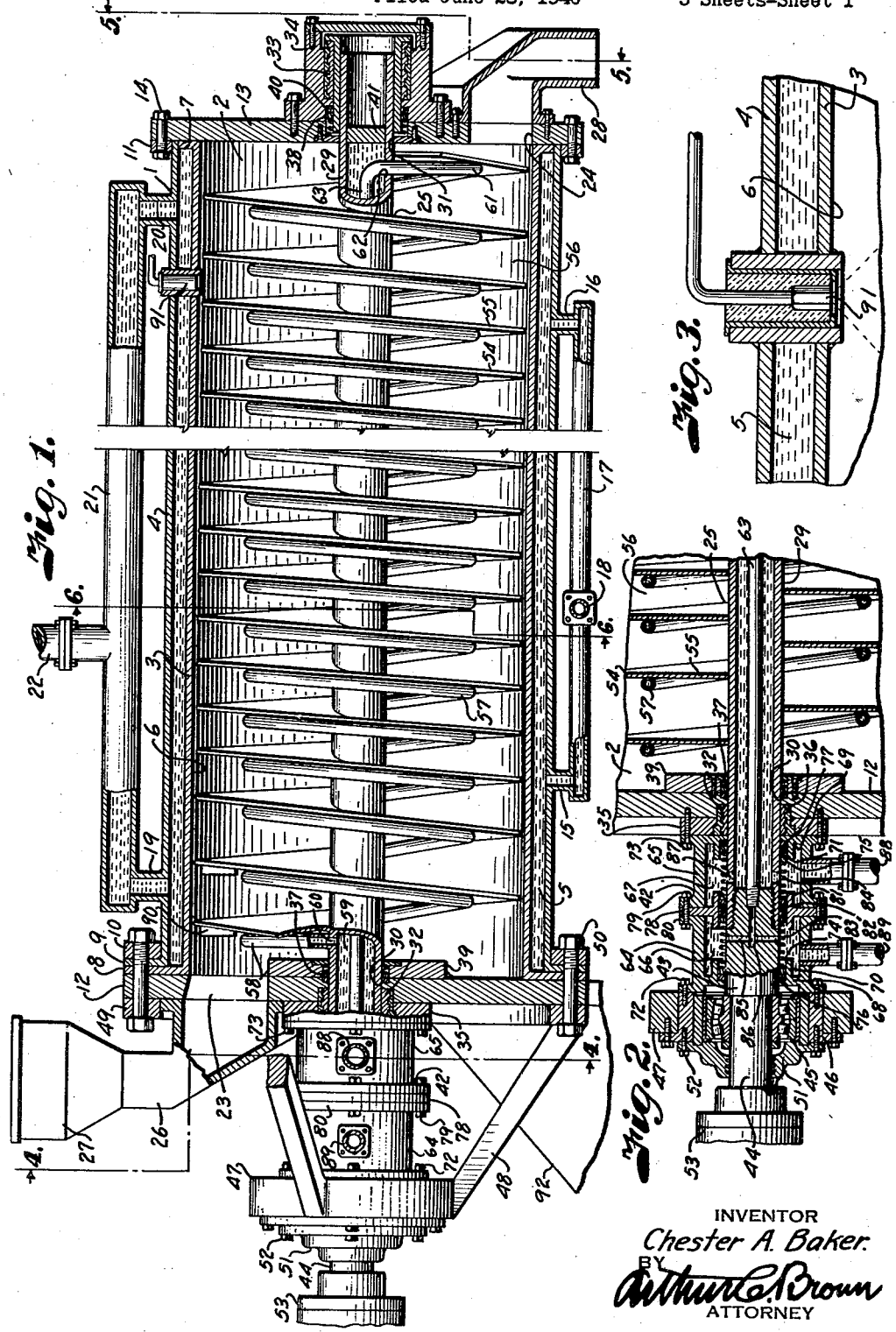
INVENTOR
Chester A. Baker.
BY
Arthur C. Brown
ATTORNEY Nov. 17, 1942.    C. A. BAKER    2,302,169
APPARATUS FOR FREEZING BULK MATERIALS
Filed June 28, 1940    3 Sheets-Sheet 2
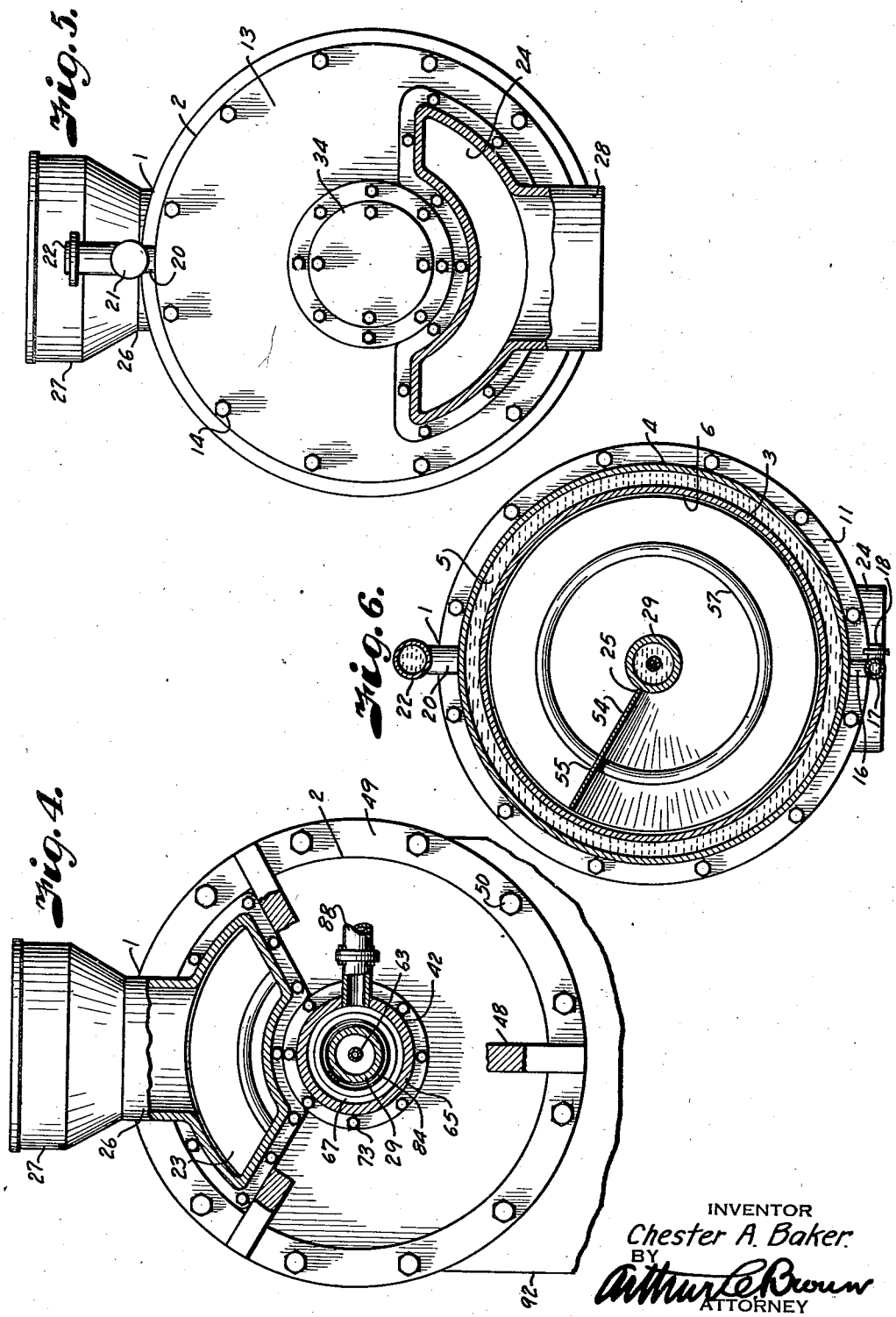
INVENTOR
Chester A. Baker
BY
Arthur L. Brown
ATTORNEY

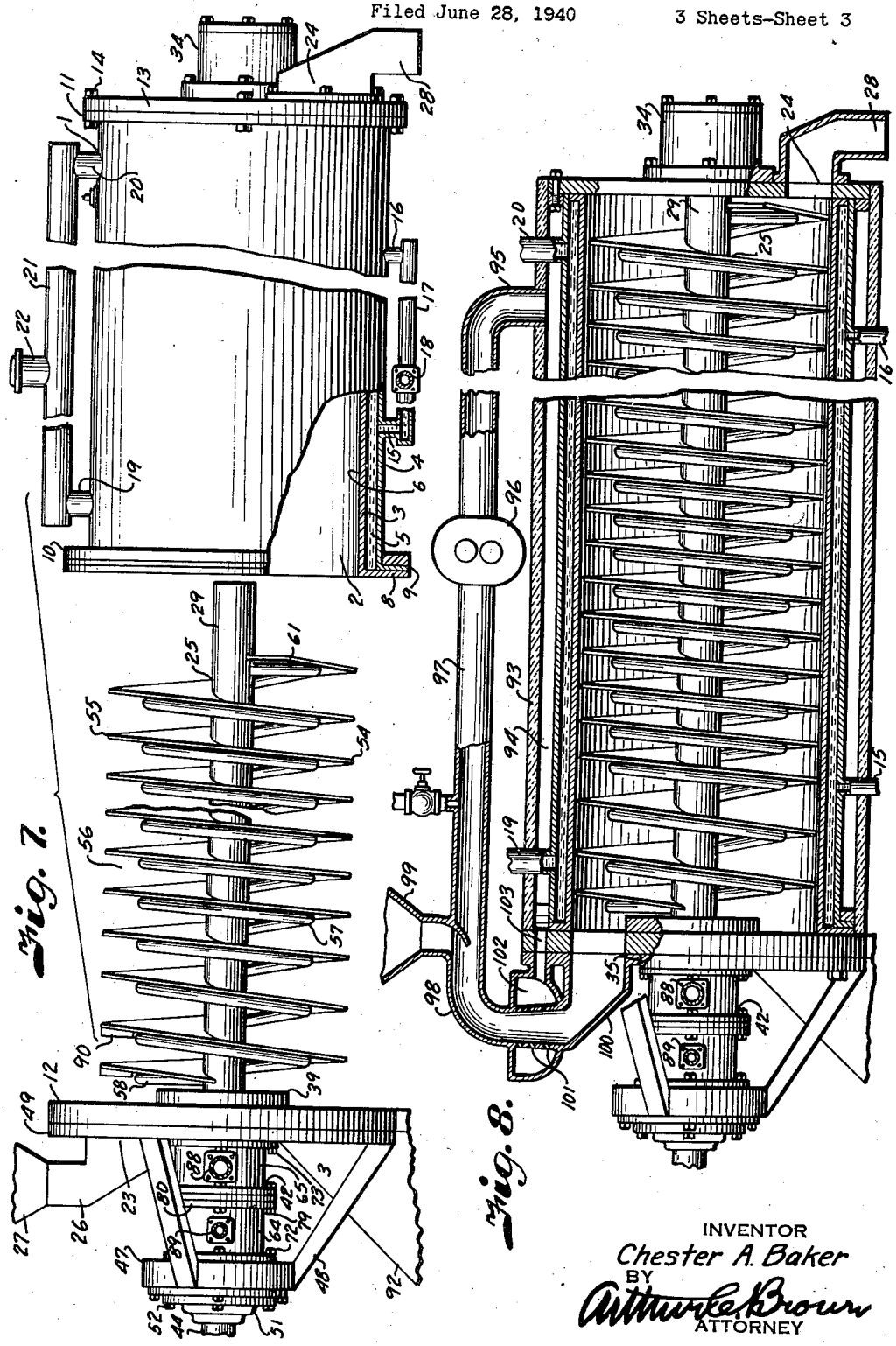

Patented Nov. 17, 1942

2,302,169

UNITED STATES PATENT OFFICE 2,302,169

APPARATUS FOR FREEZING BULK MATERIALS

Chester A. Baker, Glen Ridge, N. J.

Application June 28, 1940, Serial No. 342,966

17 Claims. (Cl. 62—114)

This invention relates to quick freezers, and more particularly to an apparatus of this character for rapidly freezing food products, such as peas, beans, cherries, crushed fruits, small fish, oysters, and other perishable products of liquid, solid, or semi-solid character, in bulk.

It is well known that products of this character must be frozen rapidly to avoid objectionable change in their cell structure and other physical properties, but difficulties have heretofore been encountered in collective freezing of large quantities of foodstuffs in bulk because of insufficient contact of the particles with heat interchange surfaces due to limitations in time of travel of the product through the freezer and size of the equipment because many food products are rapidly perishable and should be processed at the source of production before bacterial action begins, consequently expensive and heavy equipment heretofore employed is not suitable for the purpose.

It is, therefore, the principal object of the present invention to provide apparatus of high capacity but relatively low initial cost, capable of economically freezing food products while in continuous movement.

Other objects of the invention are to provide an apparatus readily adapted for transportation from one source of food products to another; to provide for initial turbulence of the particles to be frozen so as to prevent freezing thereof to the heat exchange surfaces with which the particles are contacted, to provide for movement of the products through the apparatus with less turbulence and more compact order, and finally to provide means for promoting separation of the frozen particles before discharge thereof from the apparatus.

It is also an object of the invention to apply a frozen mist or frost to the frozen materials prior to final packaging thereof, so as to maintain the frozen materials in a fully hydrated condition over long periods of time.

A further object of the invention is to provide for precooling a product by contact with cooled air prior to introduction thereof into the freezing chamber in a manner to reduce the surface moisture and prevent frosting of the heat transfer surfaces of the conveyor, while promoting frosting of the individual particles which are frozen in the equipment.

A further object is to provide an apparatus that may be readily cleaned and kept in sanitary condition.

In accomplishing these and other objects of the invention, I have provided improved structure, the preferred forms of which are illustrated in the accompanying drawings, wherein:

Fig. 1 is a longitudinal section through a quick freezer constructed in accordance with the present invention.

Fig. 2 is a longitudinal section of the conveyor shaft support at one end of the freezer, partly illustrating the refrigerant inlet and outlet connections therewith.

Fig. 3 is an enlarged section through a portion of the freezer wall, partly illustrating the nozzle for discharge of a frosting medium onto the particles of the frozen product prior to their discharge from the freezing chamber.

Fig. 4 is a cross-section through the freezer on the line 4—4 of Fig. 1.

Fig. 5 is a similar section on the line 5—5 of Fig. 1.

Fig. 6 is a cross-section on the line 6—6 of Fig. 1.

Fig. 7 is a side elevational view showing the freezing chamber removed from the conveyor for cleansing purposes, parts being broken away to shorten the illustration.

Fig. 8 is a longitudinal section through a modified form of the invention.

Referring more in detail to the drawings:

I designates a quick freezer constructed in accordance with the present invention for continuous processing of large quantities of perishable commodities in the bulk. The freezer includes a chamber 2, preferably in the form of a cylinder having an inner annular wall 3 encircled by a spaced outer wall 4 to provide a refrigerant containing or expansion space 5 therebetween whereby the inner wall forms a heat exchange surface 6. In the illustrated instance, one end of the inner wall is provided with an annular flange 7, inset within the outer wall 4 and secured thereto in any suitable manner to provide a fluid-tight joint. The opposite end of the inner wall has a similar but larger flange 8 lapping a corresponding flange 9 on the outer wall 4 to close that end of the expansion space 5. Also fixed to the respective ends of the outer wall are rings 10 and 11 to attach heads 12 and 13 which close the ends of the freezing chamber, the head 13 being secured to the ring 11 by fastening devices such as bolts 14.

A refrigerating medium, for example a readily volatile liquid, is admitted to the space 5 through connections 15 and 16 of a manifold 17 that is supplied through a conduit 18 leading to a suitable refrigerant compressing and condensing apparatus (not shown). The refrigerating medium acting in the space 5 extracts heat from the freezing chamber through the wall 3 thereof in accordance with well known refrigeration methods and is discharged through connections 19 and 20 into a manifold 21 for return to the compressor apparatus through a pipe 22.

The freezing chamber thus described is preferably arranged with the axis thereof in horizontal position whereby a product to be frozen is moved longitudinally thereof from an inlet 23 in the head 12 to an outlet 24 in the head 13 by means of a conveyor 25. Connected with the inlet 23 is a duct 26 leading from a hopper 27 through which the product is discharged in a substantially continuous stream to the freezing chamber. The outlet opening 24 is connected with a discharge spout 28 so that the frozen product may be discharged therethrough into suitable containers (not shown).

In accordance with the present invention the conveyor 25 is constructed to constitute a refrigerating element for furnishing additional heat exchange surface within the freezing chamber, thereby assuring rapid freezing in a relatively short period of time with a more compact equipment. The conveyor therefore includes a tubular shaft 29 having the ends thereof projecting through bearing openings 30 and 31 in the respective heads 12 and 13 which mount suitable bearings 32 and 33, the bearing 33 being retained in a closed housing 34 fixed to the head 13 and the bearing 32 being retained in a plate 35 cooperating with a recess 36 in the head 12. The openings 30 and 31 are sealed about the shaft with suitable packings as indicated at 37 and 38 respectively, the packing 37 being retained in a plate 39 attached to the inner face of the head 12 and the packing 38 within the opening 31 and a registering recess 40 provided in the housing 34 as clearly shown in Fig. 1. The end of the shaft which is journaled in the bearing 33 is closed by a plug 41 inset within the end thereof and in substantial registry with the head 13. The opposite end of the shaft projects through the bearing 32 into a sectional packing box 42 and is shown as threadedly connected with a head 43 on a solid shaft extension 44. The shaft extension 44 is journalled within an antifriction bearing 45 carried within a bushing 46 that is supported by a collar 47, the collar 47 in turn being carried by arms 48 which are fixed to a ring 49 that abuts against the head 12. The ring 49 is thus located in registry with the flanges 8 and 9, so that it may be secured with the same fastening devices such as bolts 50. The inner race of the bearing 45 abuts against the shoulder formed by the head 43 and the outer race thereof is retained in position by a cap 51 which is secured to the bushing 46 by fastening devices as indicated at 52. The shaft extension 44 extends through the cap 51 and is connected by means of a coupling 53 with any suitable driving mechanism (not shown) which is capable of rotating the conveyor at the desired speed.

Fixed on the conveyor shaft is a helical wound metal ribbon 54, of suitable width so that the outer edge thereof substantially contacts the heat exchange surface 6 of the chamber 2. The flights 55 of the helix are spaced apart to cooperate with the shaft 29 and the wall 4 in forming a helical passageway 56 extending substantially the length of the freezing chamber and through which a product to be frozen is progressively advanced incidental to rotation of the conveyor. In order that the flights of the conveyor may have positive heat exchange surfaces so that the entire surface of the passageway 56 is effective, each flight has fixed thereto the convolution 57 of a helical wound duct in which a refrigerating medium is circulated. The front end 58 of the duct is connected with the passageway 59 of the shaft through a lateral opening 60 while the other end 61 extends through an opening 62 at that end of the shaft to connect with an axial supply duct 63 having connection with the head 43, previously described. The terminal 61 is suitably sealed in the shaft as by welding to provide a leak-tight joint.

The packing box 42 includes a pair of ring-like sections 64 and 65 of larger diameter than the shaft to form annular passageways 66 and 67. The outer ends of the sections are closed by heads 68 and 69 having flange portions 70 and 71 respectively encircling the shaft head 43 and the projecting end of the tubular shaft 29. The sections are respectively secured to the bushing 46 and plate 35 by suitable fastening devices 72 and 73. The flanges 70 and 71 provide recesses 74 and 75 to receive packing rings 76 and 77 to seal the outer sides of the passageways 66 and 67 and prevent leakage therethrough.

The sections 64 and 65 abut against opposite sides of a partition 78 that is retained in concentric relation therewith by fastening devices 79 extending through flanges 80 on the ring-like sections and through the partition plate 78 as shown in Fig. 2. The plate 78 also includes a flange 81 which encircles the shaft to provide space for receiving packing rings 82 similar to the packing rings 76 and 77 at the opposite ends of the sections. The packing rings are yieldingly pressed into sealing contact with the shaft by springs 83 and 84 as shown in Fig. 2. The passageway 66 connects with the conduit 63 through radial ports 85 connecting with an axial port 86 and the passageway 67 connects with the passageway 59 of the shaft through openings 87. Refrigerating medium is supplied to the passageway 66 through a duct 89 which may connect with the duct 18, and expended refrigerant is discharged from the passageway 67 through a duct 88 that may connect with the return pipe 22, previously described.

I have found it desirable to effect turbulence of the particles when first admitted to the freezing chamber so that they do not linger in contact with any one portion of the heat exchange surface until the surface moisture thereon has evaporated or frozen, otherwise there may be a tendency for the particles to freeze together or to the surface of the conveyor. In order to promote this turbulence, at least the first flights at the inlet end of the conveyor are spaced apart a greater distance than the intermediate flights to give greater room for the particles and freedom of movement therefor. The turbulence thereof may be increased by providing the flights of the conveyor with suitable projections 90 or other means for picking up and carrying the particles as the conveyor is rotated. With this arrangement the particles are carried by the projections up the side wall of the chamber to a point where they roll off the projections and drop back over the top of the shaft to be caught again by the projections. The particles are thus retained in loose condition for a greater period of time before they become more compacted between the narrower spaced flights. This turbulence keeps the particles in motion to promote disposal of the surface moisture and at the same time speeds up the freezing process. The flights at the discharge end of the conveyor are also of wider spacing to promote separation of the particles for individual discharge through the spout 28.

It is well known that frozen materials carried in freezer storage over long periods of time have a tendency to dehydrate or lose a substantial amount of their moisture content. I therefore have provided means for applying a frozen water mist or frost to the frozen materials before final packaging so that they may be maintained in a fully hydrated condition for a considerable time after packaging. This is effected by means of a high pressure insulated spray nozzle 91 which is mounted in the wall of the freezer chamber and arranged to direct a spray of liquid between selected flights of the conveyor, preferably near the discharge end. At this point the cold is so intense that the fine particles of mist or water vapor are instantly frozen into snow, which combines with the frozen material to impart a sparkling appearance to the product as well as providing a moisture reserve during the time that the packaged product is in storage.

In using an apparatus constructed and assembled as described in Figs. 1 to 7 inclusive, liquid refrigerant is delivered through the pipes 89 and 18 for evaporation in the space 5 to effect extraction of heat from the interior of the chamber, and for expansion in the coil of the conveyor, to likewise extract heat therefrom. The refrigerant flows to the coil by way of the ports 85 and 86, and duct 63, to the entrance 61 of the coil. The evaporated refrigerant flows from the coil at 60, through passageway 59 of the shaft, openings 87, and passageway 67, for return through the duct 88. The various packings maintain seals to prevent leakage of the refrigerant into the freezing chamber, the shaft bearing 45, or short circuiting through the partition plate 78.

The product, for example peas, is fed into the hopper 27 and discharged therefrom through the duct 26 and inlet 23 into the freezing chamber to be caught by the first flights of the conveyor for agitation by the projections 90. The projections 90 pick up the particles and carry them up the side of the heat exchange surface 6 to a point where they fall back upon the shaft and gravitate down the sides of the conveyor flights. The peas are therefore in constant movement relatively to the heat absorbing surfaces, while the surface moisture is frozen or evaporated so that the peas will not freeze on the heat exchange surfaces. The peas will, however, be advanced between the flights of the conveyor and individually contacted with the heat exchange surfaces sufficiently to effect rapid freezing thereof. By the time the peas have reached the spray nozzle, they are completely frozen and with such rapidity that the cellular structure has not been destroyed. When they pass under the spray 9, the mist discharged therefrom freezes in the form of frost to enhance the appearance thereof. When the peas finally reach the wider spaced flights at the discharge end of the conveyor, they loosen from contact with each other and are discharged through the spout 28.

When it is necessary to clean the equipment between runs, the freezing chamber is readily unbolted from the head 12 and slid retractively away from the conveyor, as shown in Fig. 7. All the parts are thus readily exposed for sterilization by steam. If desired, the refrigerant connection for the chamber may be flexible so that the chamber may be moved without disconnecting the supply and return pipes. While the apparatus may be supported in any suitable manner, the head 12 preferably includes a fixed stand 92, and the chamber may be supported from a track or a suitable tackle (not shown).

In the form of the invention shown in Fig. 8, I have provided for positive circulation of cold air in pre-cooling contact with the product prior to its admission into the freezing chamber. This is effected by providing the outer wall of the cylinder with an insulated jacket 93 which is spaced therefrom to provide an air passageway 94 therebetween. Air is drawn from the space 94 through a duct 95 connected with the suction side of a blower 96. The discharge side of the blower is connected by a duct 97 with the product supply pipe 98. As in the preferred form, the pipe conducts the product from a hopper 99 to the inlet opening 100 of the freezer. The pipe 98 is provided with air outlet openings 101 connected with a suction manifold 102 which connects through a port 103 with the space 94 so that the air is returned for recooling. It is thus obvious that chilled air is contacted directly with the product prior to its admission to the freezing chamber so as to extract surface moisture therefrom. This contact of the air also promotes feed of the product and effects turbulence thereof. It is obvious that air in the jacket serves as an insulator and conserves the refrigerant because the external heat, normally absorbed by the refrigerant, is taken from the air which is used in precooling the product.

The operation of the form of the invention shown in Fig. 8 is otherwise the same as that of the preferred form.

From the foregoing it is obvious that I have provided a freezer having an extremely rapid heat exchange so that particles are quickly frozen. The greatly increased refrigerating surface afforded by the conveyor permits of a relatively short cylinder so as to occupy a minimum of space, thereby particularly adapting the apparatus for portability so that it may be conveniently carried to the source of the product where the product may be processed when in the most satisfactory condition and before bacterial action begins.

What I claim and desire to secure by Letters Patent is:

1. An apparatus of the character described, including a freezing chamber having an inlet and an outlet for a product to be frozen, means for moving the product through the freezing chamber, and means carried by said moving means and forming a closed passageway for the circulation of a refrigerating medium in indirect heat exchange relation with the product moved through the freezing chamber.

2. An apparatus of the character described, including a freezing chamber having an inlet and an outlet for a product to be frozen, means for moving the product through the freezing chamber, means in direct contact with said moving means for circulating a refrigerating medium in indirect heat exchange relation with the product moved through the freezing chamber, and means on the moving means for agitating the product.

3. An apparatus of the character described, including a freezing chamber having an inlet and an outlet for a product to be frozen, a screw type conveyor rotatably supported in the chamber to move the product from the inlet toward the outlet, the flights of said conveyor having refrigerant passages for a refrigerant, and means supplying a refrigerant to the passages.

4. An apparatus of the character described including a freezing chamber having an inlet and an outlet for a product to be frozen, a hollow shaft journalled in the freezing chamber, conveyor flights on the shaft, a coil coextensive with said flights and having one end connected with the shaft, a supply duct coextensive with the shaft and connected with the other end of the coil, and return and supply pipes respectively connected with the shaft and supply duct whereby a refrigerating medium is circulated through said coil.

5. An apparatus of the character described including a freezing chamber having an inlet and an outlet for a product to be frozen, a hollow shaft journalled in the freezing chamber, conveyor flights on the shaft, a coil coextensive with said flights and having one end connected with the shaft, a supply duct coextensive with the shaft and connected with the other end of the coil, packing boxes encircling the shaft and having passages connected with said supply duct and shaft, and refrigerant circulating ducts connected with the passages of the packing boxes.

6. An apparatus for freezing foodstuffs including a freezing chamber, means in the chamber for agitating the foodstuffs therein, means for supplying a refrigerant in heat exchange relation with said foodstuffs while under agitation, and means movably supporting the agitating means and said refrigerant supply means for movement in said freezing chamber.

7. An apparatus for freezing foodstuffs including a freezing chamber, means in the chamber for agitating the foodstuffs therein, means for supplying a refrigerant in heat exchange relation with said foodstuffs while under agitation, and means movably supporting said agitating means and said refrigerant supply means in said freezing chamber, said supporting means forming a conveyor for advancing the foodstuffs through the chamber.

8. An apparatus of the character described including a freezing chamber having an inlet and an outlet, and a screw type conveyor rotatable within the chamber and having flights of variable spacing to effect movement of a product introduced through the inlet at variable speeds through selected portions of the chamber.

9. An apparatus of the character described including a freezing chamber having an inlet and an outlet, and a screw type conveyor rotatable within the chamber and having flights of variable spacing to effect movement of a product introduced through the inlet at variable speeds through selected portions of the chamber, the flights adjacent the inlet having the widest spacing.

10. An apparatus of the character described including a freezing chamber having an inlet and an outlet, and a screw type conveyor rotatable within the chamber and having flights of variable spacing to effect movement of a product introduced through the inlet at variable speeds through selected portions of the chamber, the flights adjacent the inlet and outlet having the widest spacing.

11. A freezing chamber having an inlet and an outlet, a duct for feeding material through the inlet to be frozen while moving toward said outlet, and means associated with said duct for precooling the material before discharge through the inlet of the freezing chamber.

12. A freezing chamber having an inlet and an outlet, a duct for feeding material through the inlet to be frozen while moving toward said outlet, a jacket encircling the chamber to form an air cooler, and means for circulating air from said cooler into the duct for precooling the material and for returning the air to the cooler.

13. An apparatus of the character described including, a freezing chamber, means for conveying a material to be frozen through the freezing chamber, said conveying means being arranged to agitate said material in the freezing chamber, and means for discharging a mist into the freezing chamber and onto the material.

14. An apparatus of the character described including, a freezing chamber, a conveyor rotatable within the chamber and having flights to effect movement of a material to be frozen, and means for discharging a mist between selected flights of the conveyor to provide the material with a reserve moisture supply.

15. An apparatus of the character described including, a freezing chamber having an inlet and an outlet for material frozen in said chamber, means for conveying the material through the freezing chamber, means for supplying a refrigerant to the freezing chamber, and means for discharging a mist into the freezing chamber separate from said refrigerant at a point near said outlet to provide a reserve moisture supply for the material.

16. An apparatus of the character described including, a freezing chamber, a conveyor rotatable within the chamber and having flights of variable spacing to effect movement of a material to be frozen at variable speed, and means for discharging a mist onto the material between selected flights of narrower spacing to provide the material with a reserve moisture supply.

17. An apparatus of the character described including a freezing chamber having an inlet and an outlet for material to be frozen, a conveyor having flights of variable spacing to move the material at variable speeds, said flights adjacent the inlet and outlet having wider spacing, and means for discharging a mist onto the material between the endmost flights of narrow spacing nearest said outlet to provide the material with a reserve moisture supply.

CHESTER A. BAKER.